E. HOLMGREEN.
FISHING DEVICE.
APPLICATION FILED SEPT. 20, 1909.

993,374.

Patented May 30, 1911.

Witnesses:

Inventor:
Eddie Holmgreen
by Joshua R. H. Potts
his Attorney.

UNITED STATES PATENT OFFICE.

EDDIE HOLMGREEN, OF ROCKFORD, ILLINOIS.

FISHING DEVICE.

993,374. Specification of Letters Patent. Patented May 30, 1911.

Application filed September 20, 1909. Serial No. 518,581.

*To all whom it may concern:*

Be it known that I, EDDIE HOLMGREEN, a citizen of the United States, residing at Rockford, county of Winnebago, and State of Illinois, have invented certain new and useful Improvements in Fishing Devices, of which the following is a specification.

My invention relates to bait for fishing and the object of my invention is the provision of a device of such character designed for the holding of a live minnow in such a position as to adapt the same to serve as bait without in any way mutilating the same, such as is necessary at the present time in securing a minnow to a fish hook; it being my object to provide a device whereby the minnow when used as bait may be kept in a live condition as long as possible.

A further object is the provision of a bait holder whereby the bait although exposed to view when arranged therein, will at the same time be protected against injury and mutilation by fish attempting to grasp the same.

Another object is the provision of a bait device as mentioned which may be easily and quickly manipulated, which will be of high efficiency in serving in the capacity above stated, and which will be simple and inexpensive of construction.

Other objects will appear hereinafter.

With these objects in view my invention consists in a bait device characterized as above mentioned and in certain details of construction and arrangement of parts all as will be hereinafter fully described and particularly pointed out in the appended claim.

Figure 1:
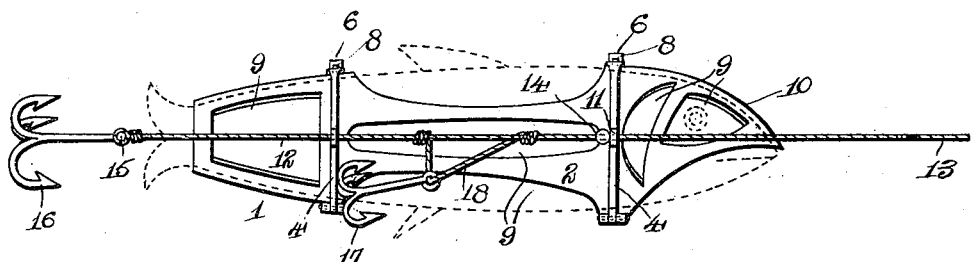
Figure 2:
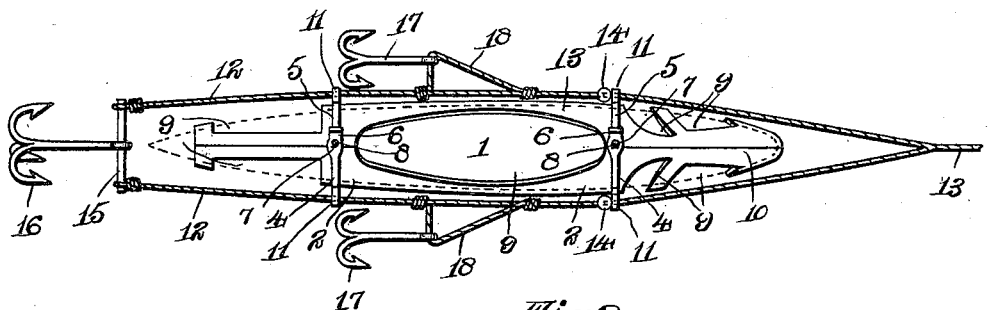
Figure 3:
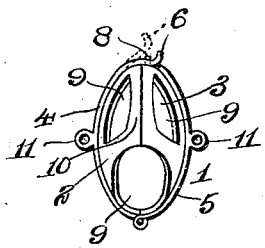

My invention will be more readily understood by reference to the drawings forming a part of this specification, and in which, Figure 1 is a side elevation of my device in its preferred form, a minnow in dotted lines being shown arranged therein, Fig. 2 is a top plan view thereof, and Fig. 3 is a front elevation of the shell or minnow-holder proper.

The device is simply a metallic foraminated shell split through its vertical longitudinal center forming two similar half parts 2 and 3. Provided upon the outer surface of each of the parts 2 and 3 are transversely disposed reinforcing straps 4 and 5 respectively secured, preferably by soldering thereto, those on one side being positioned in transverse alinement with those on the other, the lower extremities of alining thereof being interlocked and connected by a hinge pin whereby a hinge connection between said shell parts is effected. The upper end portion 6 of the straps 4 preferably extend beyond the inner edge of the member 2, as clearly shown in Fig. 3, hence when the shell parts are in closed position, said strap end portions overlap the adjacent outer surface of the member 3; slots 7 are provided in the former engaging pins 8 projecting from the outer adjacent surface of the shell part 3 to lock said shell parts in closed position. With such construction, to unlock said shell parts, the outer ends 6 of the straps 4 need only to be sprung outwardly sufficiently to effect the disengagement thereof with the pins 8, this being readily effected by means of the fingers. However, although I have shown the hinge connections and fastening means formed integrally with the reinforcing straps 4 and 5, this being a simple and economical construction, I do not wish to limit myself thereto as such parts, if desired, may be formed independent therefrom.

The shell as seen is of an inner contour such as to adapt the same to snugly accommodate an ordinary bait minnow of a required length, the same being so designed that the minnow, when arranged therein, will be plainly visible through the foramina or openings 9 formed in the comprising walls thereof. By forming the rearward end of the shell with an opening of dimensions adapting the same to snugly encircle the body of the minnow just forward of the tail thereof, as shown, this being the thinnest part of the body of an ordinary minnow, the latter, when arranged in the shell, will evidently be held fast against rearward movement therein. By forming the forward end of the shell with an obliquely downwardly curved wall 10 so positioned as to abut the ends of the minnow arranged therein, the latter, when arranged in the shell, will evidently be locked against forward movement therein. Hence, it is clear that a minnow placed in the shell will be positively held therein, escapement thereof being absolutely prevented except by reason of the comprising shell parts becoming unlocked and separated.

Extending through alining eyes 11 provided upon the lateral outer surfaces of the shell 1, said eyes being preferably formed integral with the straps 4 and 5, are substantially parallelly extending lines 12 secured at their forward extremities to a common line 13 extending to the fishing rod. Enlargements 14 provided upon the lines 12 engaging the foremost eyes 11, as shown, serve as stops whereby the shell is locked to said lines. A cross bar 15 connects the rearward extremities of said lines. Having the forward end of its shank secured to said bar is a fish hook 16 preferably of the cluster type as shown. Similar hooks 17 are also provided at either side of the body, the same being preferably secured to loops 18 provided substantially centrally in the lines 12.

While I have shown what I deem to be the preferable form of my device, I do not wish to be limited thereto, as there might be various changes made in the details of construction and arrangement of parts without departing from the spirit of my invention comprehended within the scope of the appended claim. And although I have designed my device with special reference to the holding of minnows, I may use the same for the holding of bait of any other character or form to which it is applicable.

Having described my invention what I claim as new and desire to secure by Letters Patent is:

The combination in a fishing device of the class described, of a foraminated shell of a form adapting the same to snugly envelop the body of a minnow, said shell being comprised of two similar parts hinged together at their longitudinal edges, reinforcing transversely disposed straps arranged about said body, the lower extremities of the straps of the opposing shell parts interlocking and serving as hinges, the upper extremities of the straps of one of said shell parts overlapping the adjacent edge of the other shell part serving as fastening means to hold said parts in closed position, substantially parallelly extending lines extending longitudinally of said body at either side thereof, said lines extending through and being secured to eyes formed in said straps, and cluster ensnaring-hooks secured to said lines arranged at either side and at the rear end of said shell, substantially as described.

In testimony whereof I have signed my name to this specification in the presence of two subscribing witnesses.

EDDIE HOLMGREEN.

Witnesses:
GERTRUDE L. MCCLENEGHAN,
NELLIE ALICE TAPE.

Copies of this patent may be obtained for five cents each, by addressing the "Commissioner of Patents. Washington, D. C."